US007523049B2

(12) United States Patent
Tokorotani

(10) Patent No.: US 7,523,049 B2
(45) Date of Patent: Apr. 21, 2009

(54) POINT OF SALE APPARATUS

(75) Inventor: Mitsuhiro Tokorotani, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 618 days.

(21) Appl. No.: 10/231,145

(22) Filed: Aug. 30, 2002

(65) Prior Publication Data

US 2003/0055730 A1 Mar. 20, 2003

(30) Foreign Application Priority Data

Sep. 4, 2001 (JP) ............................. 2001-267162

(51) Int. Cl.
*G06Q 20/00* (2006.01)
(52) U.S. Cl. ............................. 705/16; 705/14; 705/24
(58) Field of Classification Search ............ 705/16–25, 705/14
See application file for complete search history.

(56) References Cited

U.S. PATENT DOCUMENTS

| 5,201,010 | A | * | 4/1993 | Deaton et al. ............... 382/139 |
| 5,353,219 | A | * | 10/1994 | Mueller et al. ................ 705/16 |
| 5,481,094 | A | * | 1/1996 | Suda ........................... 705/14 |
| 5,765,142 | A | * | 6/1998 | Allred et al. .................. 705/26 |
| 6,148,313 | A | * | 11/2000 | Freidin et al. ............... 708/422 |
| 6,216,129 | B1 | * | 4/2001 | Eldering ...................... 707/10 |
| 6,334,110 | B1 | * | 12/2001 | Walter et al. ................. 705/14 |
| 6,397,193 | B1 | * | 5/2002 | Walker et al. ................. 705/16 |
| 6,412,012 | B1 | * | 6/2002 | Bieganski et al. ........... 709/232 |
| 6,415,262 | B1 | * | 7/2002 | Walker et al. ................. 705/14 |
| 6,507,352 | B1 | * | 1/2003 | Cohen et al. ................ 715/817 |
| 6,778,967 | B1 | * | 8/2004 | Nicholson .................... 705/14 |
| 6,820,062 | B1 | * | 11/2004 | Gupta et al. ................. 705/16 |
| 6,862,575 | B1 | * | 3/2005 | Anttila et al. ................. 705/14 |
| 6,877,032 | B1 | * | 4/2005 | Philyaw ....................... 709/217 |
| 2001/0014870 | A1 | * | 8/2001 | Saito et al. ................... 705/14 |
| 2002/0082925 | A1 | * | 6/2002 | Herwig ........................ 705/16 |
| 2002/0123957 | A1 | * | 9/2002 | Notarius et al. .............. 705/37 |
| 2002/0161653 | A1 | * | 10/2002 | Walker et al. ................ 705/22 |
| 2002/0169686 | A1 | * | 11/2002 | Zweben et al. ............... 705/26 |

(Continued)

FOREIGN PATENT DOCUMENTS

JP 4-266198 9/1992

(Continued)

OTHER PUBLICATIONS

Galenskas, Stephanie, "Targeting and reaching the right customers more effectively . . . ", Direct Marketing, vol. 60, No. 1, p. 23, May 1997.*

(Continued)

*Primary Examiner*—F. Zeender
*Assistant Examiner*—Christopher Buchanan
(74) *Attorney, Agent, or Firm*—Whitham Curtis Christofferson & Cook, PC

(57) ABSTRACT

A POS (point of sales) apparatus has: database constructing means for classifying a commodity with a high level of relation to a commodity sold to the customer to prepare a database for related commodities; and processing means for retrieving a related commodity with a high level of relation to a commodity sold to the customer from the database by using, as a key word, the above commodity sold to the customer and for printing information of the related commodity on the receipt.

12 Claims, 5 Drawing Sheets

U.S. PATENT DOCUMENTS

2003/0149628 A1 * 8/2003 Abbosh et al. ................ 705/16

FOREIGN PATENT DOCUMENTS

| JP | 6-74362 | | 10/1994 |
|---|---|---|---|
| JP | 11-66432 | | 3/1999 |
| JP | 11-066432 | * | 3/1999 |
| JP | 11-306442 | | 11/1999 |
| JP | 3073990 | | 9/2000 |
| JP | 2000-315283 | | 11/2000 |
| JP | 2001-126147 | | 5/2001 |
| JP | 2001-229463 | | 8/2001 |

OTHER PUBLICATIONS

Johnson, Steven, "Retail systems: no longer business as usual . . . ", Journal of Systems Management, vol. 43, No. 8, p. 8, Aug. 1992.*

Japanese Office Action dated Nov. 16, 2004 with English translation of pertinent portions.

* cited by examiner

FIG.3

```
           STORE ○ ○ ○
         XXX, MINATO-KU, TOKYO
                    3:23 P.M.  JAN., 2001

HALF COAT                    ¥19.800
SUBTOTAL                     ¥19.800
CONSUMPTION TAX 5.0%           ¥990
TOTAL                        ¥20.790

☆ ☆ ☆ ☆ ☆ ☆ ☆ ☆ ☆ ☆ ☆ ☆ ☆ ☆ ☆ ☆

THANK YOU FOR YOUR SHOPPING.

WE ARE READY FOR PROVIDING

CASHIMERE MUFFLER

JUST RIGHT FOR HALF COAT

FOR YOU.

LOOKING FORWARD TO YOUR NEXT
VISIT.

NO******
```

POINT OF SALE APPARATUS

FIELD OF THE INVENTION

The invention relates to a point of sale (POS) apparatus and more particularly to a POS apparatus which, when issuing a receipt for a commodity sold to a customer, can print, on the receipt, information regarding a commodity related to the commodity sold to the customer.

BACKGROUND OF THE INVENTION

At the present time, POS (point of sales) apparatuses are installed in most stores independently of whether stores are retail stores or large-scaled stores. The POS apparatus comprises a display for indicating the amount of money, a bar code reader, a mechanism through which printing is carried out on a receipt and a journal, a keyboard for input and the like. Further, the POS apparatus is constructed so as to be connected to a host computer. In this POS apparatus, when a customer brings commodities, which the customer wishes to buy, to a check-cut counter, a store person operates the POS apparatus to read bar codes printed on tags attached to the commodities with a bar code reader. As a result, prices of all the commodities sold to the customer are totaled, and the sum total is indicated on the display, and, in addition, the names of purchased commodities and the prices of the respective commodities are printed on and output to a receipt and a journal. When a plurality of commodities of an identical type have been purchased, the amount of money obtained by multiplying the price by the number of commodities of the identical type is printed on the receipt and the journal. When a plurality of different types of commodities are purchased, for the commodities, the name and the price are printed on the receipt and the journal in the order of reading of bar codes. Further, when a host computer is connected to the POS apparatus, registration of commodities, unit prices and the like can be carried out from the host computer side. Furthermore, for each commodity, the totalization of amounts of sales and the totalization of amounts of cost prices for each month can be carried out. This can realize merchandise control in the store.

In recent years, the utilization of a receipt M in accounting, which is originally intended, as well as in service to customers has been proposed. For example, Japanese Patent Laid-Open No. 74362/1994 proposes a method wherein advertisement information on bargain sale, information on discount useful for bargain sale and the like are printed in the form of a bar code as a coupon on a receipt to eliminate the need to separately issue the coupon. Japanese Patent Laid-Open No. 306442/1999 proposes a method wherein a facial image (a photograph-like image, an illustration or the like) of an operator in the store and an introduction sentence of the operator, together with the contents of transactions, are printed on the receipt to give a good impression to the customer and, further, to allow the customer to have a sense of closeness to the store. Further, Japanese Patent Laid-Open No. 315283/2000 proposes a method wherein, in settling accounts at a check-out counter, based on a request from the customer, a description of cooking most related to purchased commodities is determined while taking the time necessary for settling the accounts into consideration and is printed on the receipt. This can eliminate the need to investigate or copy a recipe for cooking using the purchased commodities and thus can efficiently purchase materials for cooking and can efficiently perform cooking.

Japanese Patent Laid-Open No. 266198/1992 proposes an apparatus which, in response to a series of input operations, a plurality of message data, which have been properly preset in accordance with one commodity, are successively output from a display part. Specifically, a plurality of message data are preset in accordance with classification which has been done according to a series of input operations from the start of the registration of one transaction to the close of the registration of the one transaction, such as the operation of PLU key or section key for registering sales data for each classification, the operation of a bar code reader, the operation for instructions on subtotaling processing, and the operation for instructions on close processing, are related to the series of input operations, and are stored in message data storage means. The message data read from the message data storage means is sent to output means. Further, the plurality of message data stored in the message data storage means in accordance with the classification of input sales data are output from output control means in response to a series of input operations.

For example, the plurality of message data, which have been properly preset in accordance with commodities, are stored in the message data storage means in relation to a series of input operations, for example, "immediately after the registration of a commodity," "at the time of the operation of a subtotal key," and "at the time of the operation of a close key." When the registration of one transaction is started and the operation of the registration of commodities is carried out, the output control means reads message data corresponding to the "immediately after the operation of registration" among the plurality of message data for the commodities and sends the message data to the output means. Upon the depression of the "subtotal key" for instructions on subtotaling processing, when there is a commodity for which the message data is stored, the message data is output. Therefore, when the registration of one transaction is ended and the "close key" is operated, if there is a commodity, among the registered commodities, for which the message data is stored in relation to the "at the time of close key operation," the message data is output. This permits a plurality of message data properly preset according to the classification to be successively output in response to a series of input operations. As a result, various message data of proper contents related to the classification can be provided at proper timing. This can contribute to an improvement in services to customers, sales promotion and the like.

According to all the above-described conventional POS apparatuses, however, contents, such as issue of coupons, introduction of staffs, and recipe of cooking, which are not related directly to purchased commodities, are printed on a receipt at the time of settling of the accounts. That is, the receipt is used for other applications or other purposes, and data on commodities related directly to the commodity sold to the customer are not prepared. Therefore, for example, commercial activity and advertisement activity utilizing relation of commodities to each other or one another cannot be performed. This will be more specifically described.

(1) Since advertisement activity to customers is carried out indiscriminately, close advertisement according to customers cannot be carried out.

(2) Since advertisement activity to customers is carried out indiscriminately, advertising costs are increased.

(3) Since advertisement is carried out without the investigation of relation to commodities sold to customers, useless ordering is carried out.

SUMMARY OF THE INVENTION

Accordingly, it is an object of the invention to provide a POS apparatus which can automatically prepare database on related commodities based on information of commodities sold to customers, can provide information on a commodity related to the commodity sold to the customer, and, in addition, can prepare materials useful for ordering work and the like.

According to the first feature of the invention, a POS (point of sales) apparatus, which is adapted for settling the accounts for a commodity sold to a customer and for printing the results on a receipt to be handed to the customer, comprises:

database constructing means for classifying a commodity with a high level of relation to a commodity sold to the customer to prepare a database for related commodities; and processing means for retrieving a related commodity with a high level of relation to a commodity sold to the customer from the database by using, as a key word, the above commodity sold to the customer and for printing information of the related commodity on the receipt.

According to this construction, when a customer has purchased a commodity, commodities having a high level of relation to the commodity sold to the customer are classified and a database is prepared by database construction means. Based on this database, a commodity having a high level of relation to the commodity sold to the customer is retrieved and extracted by processing means using, as a key word, the commodity sold to the customer and is printed on a receipt. Since information on a related commodity having a high possibility of the customer buying next time can be automatically printed on a receipt, advertisement activity to customers, who come to the store, can be efficiently and effectively made. Further, since a database for a commodity having a high level of relation to the commodity sold to the customer is automatically updated, the latest related commodity database can be utilized.

BRIEF DESCRIPTION OF THE DRAWINGS

The invention will be explained in more detail in conjunction with the appended drawings, wherein:

FIG. 3 is a diagram of an embodiment of a receipt print according to the invention;

DESCRIPTION OF THE PREFERRED EMBODIMENTS

Preferred embodiments of the invention will be explained in conjunction with the accompanying drawings.

Figure 1:
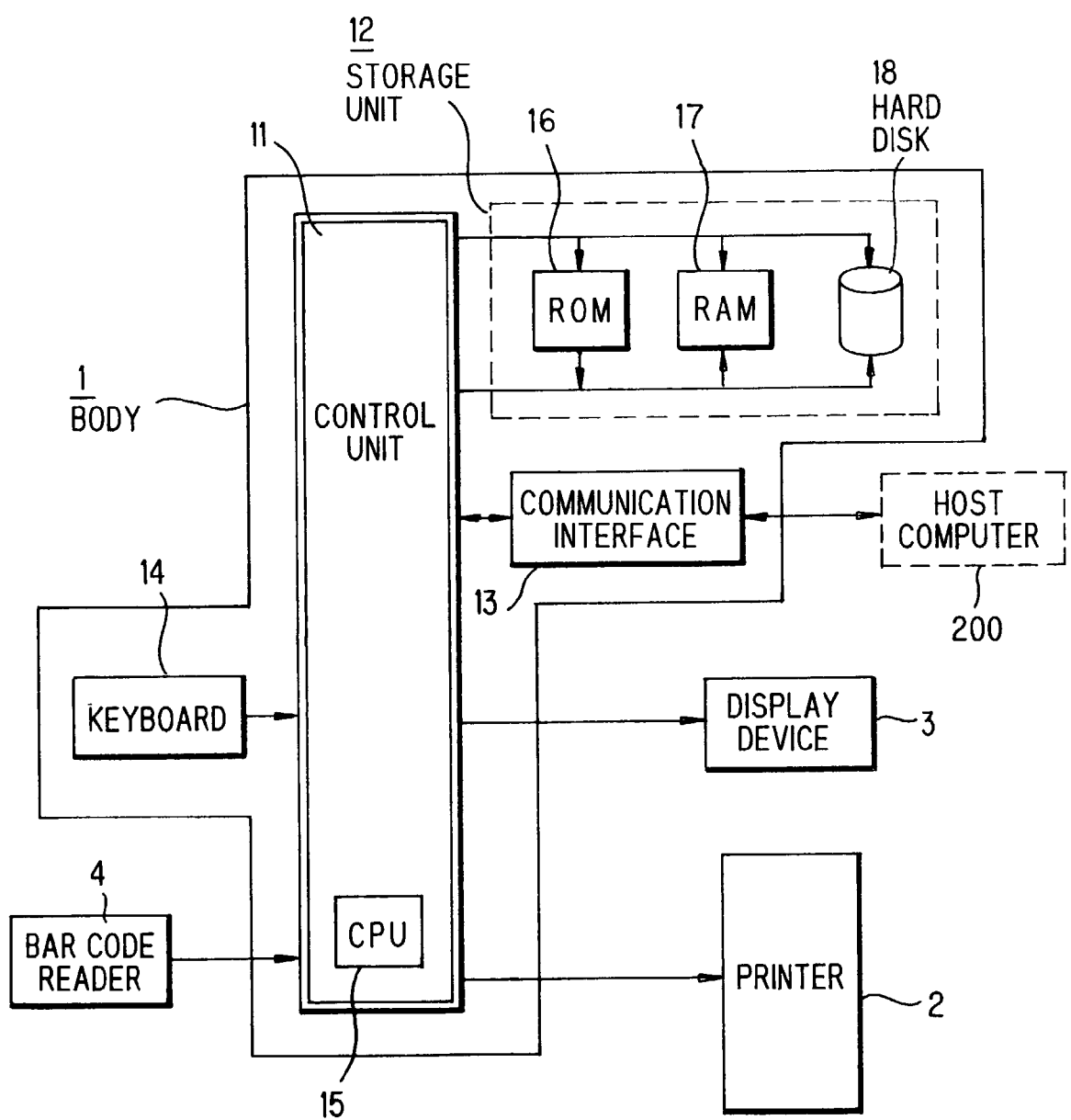
FIG. 1 is a block diagram showing a preferred embodiment of the POS apparatus according to the invention.

FIG. 1 shows a preferred embodiment of the POS apparatus according to the invention.

A POS apparatus 100 is composed mainly of a body 1. A printer 2 for printing a receipt, a display device 3, and a bar code reader 4 are connected to the body 1. The body 1 comprises; a control unit 11 provided with CPU 15; a storage unit 12; a communication interface 13; and a keyboard 14.

The display device 3 comprises a liquid-crystal display or a CRT display. In the drawing, the printer 2 is externally mounted. Alternatively, the printer 2 may be built in the body 1. The storage unit 12 comprises: ROM (read-only-memory) 16 in which a program for operating the POS apparatus 100 is stored; and RAM (random-access-memory) 17 for temporarily storing data and results of computation; and a hard disk 18 for storing a related commodity database. Upon connection of a host computer 200, the communication interface 13 is used for communication. The keyboard 14 comprises numeric keys for 0 to 9, keys for +, −, ×, ÷ and the like, and various other keys. The keyboard 14 is used, for example, for inputting prices of commodities not read by a bard code reader 4.

An example of related commodity database stored in the hard disk 18 or a storage unit (not shown) in the host computer 200 is shown in Table 1. In the related commodity database shown in Table 1, commodities having a high level of relation are ranked according to the level of relation (determined by a related commodity counter).

TABLE 1

|  | Related commodity | Commodity 1 | Commodity 2 | Commodity 3 | Commodity 4 | Commodity 5 |
|---|---|---|---|---|---|---|
| Purchased commodity | Commodity 1 |  | A | x | B | A |
|  | Commodity 2 | A |  | x | x | C |
|  | Commodity 3 | x | x |  | A | x |
|  | Commodity 4 | B | x | A |  | x |
|  | Commodity 5 | A | C | x | x |  |

In Table 1, A represents that commodities are in a high level of relation to each other, B represents that commodities are in a medium level of relation to each other, C represents that commodities are in a low level of relation to each other, and X represents that commodities are not related to each other. Here the commodity having a high level of relation refers to a commodity such that, although the commodity as such has a certain level of effect, the use of the commodity in combination with other commodity is expected to provide a better effect. For examples, relation among outfits for protection against the cold, such as gloves, mufflers, and fur coats, and relation among writing materials, such as staplers, leads of staplers, glues, and rulers, may be mentioned. Further, even in the case of commodities which are seemed to have only a low level of relation, when these commodities are in many cases purchased by a customer at an identical time due to the nature of sales area and the like, the commodities can be said to have a high level of relation.

Figure 2:
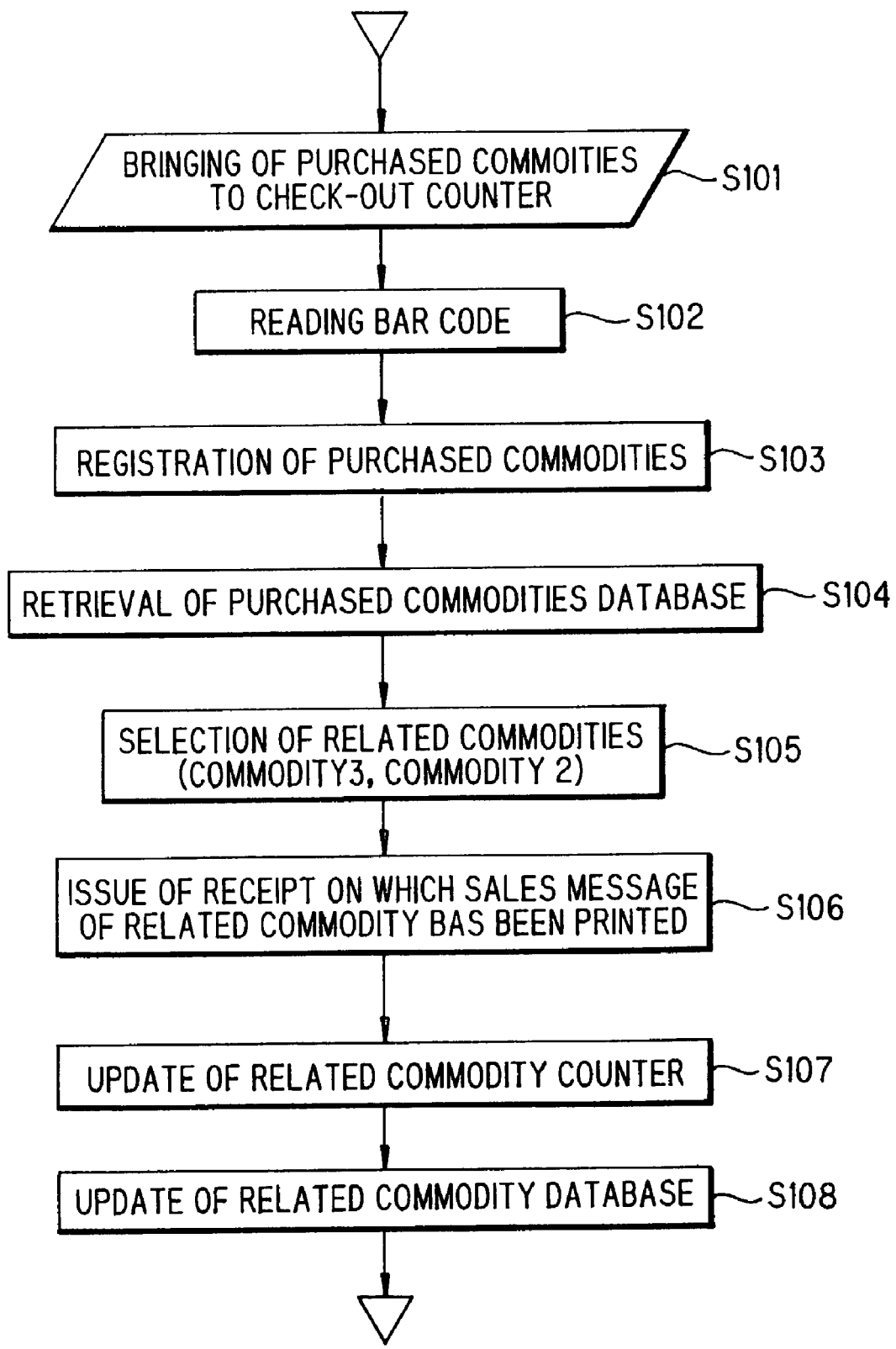
FIG. 2 is a flow chart showing processing of the POS apparatus according to the invention.

FIG. 2 shows processing of the POS apparatus according to the invention, and FIG. 3 shows one embodiment of a receipt print according to the invention. The processing in FIG. 2 is executed by the control unit 11 and the storage unit 12. In the drawing, "S" represents step.

At the outset, when a customer brings "commodity 1," which the customer wishes to buy, to a check-out counter where a POS apparatus 100 is installed (S101), a store person operates the bar code reader 4 to read a bar code of a tag attached to the "commodity 1" (purchased commodity) (S102), whereby the "purchased commodity registration" of the purchased commodity is performed (S103). Upon the purchased commodity registration, the related commodity database is searched using "commodity 1" as a key word (S104). For example, "commodity 2" and "commodity 3" are retrieved as commodities having a high level of relation to "commodity 1" (S105) A specific example thereof is shown in Table 2.

TABLE 2

| Related commodity | | Half coat | Muffler | Gloves | Perfume | Pencil | Long Coat |
|---|---|---|---|---|---|---|---|
| Purchased commodity | Half coat | | A | A | C | x | C |
| | Muffler | A | | B | C | x | A |
| | Gloves | A | B | | C | x | A |

TABLE 2-continued

| Related commodity | Half coat | Muffler | Gloves | Perfume | Pencil | Long Coat |
|---|---|---|---|---|---|---|
| Perfume | C | C | C | | x | C |
| Pencil | x | x | x | x | | x |
| Long coat | B | A | A | C | x | |

As shown in Table 2, for example, when "commodity 1" is a "half coat" as an output for protection against the cold, "muffler" of "commodity 2" having a high level of relation to the "commodity 1" is retrieved. Further, "commodity 3" having a high level of relation to the "commodity 1" is also retrieved. As shown in FIG. 3, in addition to information on the purchased commodity, i.e., "half coat," such as price and total amount of money, the name and recommendation message of commodity having a high level of relation to the purchased commodity, i.e., the "commodity 2" (and, further, "commodity 3") having a high level of relation to the "commodity 1" are printed on a receipt describing a purchase slip (S106). This can convey, to the customer, that the purchase of the "muffler" in addition to the "half coat" can further enhance warm retaining properties. This can enhance a possibility of the same customer buying the "muffler" next time. When there are a plurality of commodities related to the purchased commodity, some of these commodities may be randomly selected and printed on the receipt.

Subsequently, the "related commodity counter" stored in the hard disk 18 is updated (S107). The count of the "commodity 1" and the "commodity 2," which have been simultaneously purchased, is added to the "related commodity counter" to update the related commodity database stored in the hard disk 18 (or the storage unit in the host computer 200). The update of the "related commodity counter" is carried out for all the commodities which have been simultaneously sold to the customer.

Tables 3 and 4 show the contents of the related commodity counter. Table 3 shows the contents of the counter at previous sale (time t), and Table 4 shows the contents of the counter at this sale (time [t+1]).

TABLE 3

| Non-object commodity | | Commodity 1 | Commodity 2 | Commodity 3 | Commodity 4 | Commodity 5 | Commodity 6 |
|---|---|---|---|---|---|---|---|
| Object commodity | Commodity 1 | | 7 | 0 | 0 | 0 | 5 |
| | Commodity 2 | | | 0 | 0 | 0 | 0 |
| | Commodity 3 | | | | 0 | 0 | 0 |
| | Commodity 4 | | | | | 0 | 4 |
| | Commodity 5 | | | | | | 0 |
| | Commodity 6 | | | | | | |

TABLE 4

| Non-object commodity | | Commodity 1 | Commodity 2 | Commodity 3 | Commodity 4 | Commodity 5 | Commodity 6 |
|---|---|---|---|---|---|---|---|
| Object commodity | Commodity 1 | | 8 | 0 | 1 | 0 | 6 |
| | Commodity 2 | | | 0 | 1 | 0 | 1 |
| | Commodity 3 | | | | 0 | 0 | 0 |
| | Commodity 4 | | | | | 0 | 5 |
| | Commodity 5 | | | | | | 0 |
| | Commodity 6 | | | | | | |

An explanation will be given with reference to Tables 3 and 4. For example, when four commodities, i.e., "commodity 1," "commodity 2," "commodity 4," and "commodity 6," are sold to a customer A, the update is carried out for all of these commodities. As a result, the contents of the related commodity counter shown in Table 3 are updated as shown in Table 4. The update of the related commodity counter is carried out in such a manner that, for the value located at the intersection point of the non-object commodity column (abscissa) and the corresponding object commodity column (ordinate), at the time of purchase this time (time [t+1]), "1" is added to the previous value (time t) in Table 3 as shown in Table 4. Specifically, for "commodity 1," "7" is changed to "8"; for "commodity 2," "0" is changed to "1"; and for "commodity 4," "4" is changed to "5." For "commodity 6," since the commodity is identical, this commodity is excluded from the update.

Figure 4:
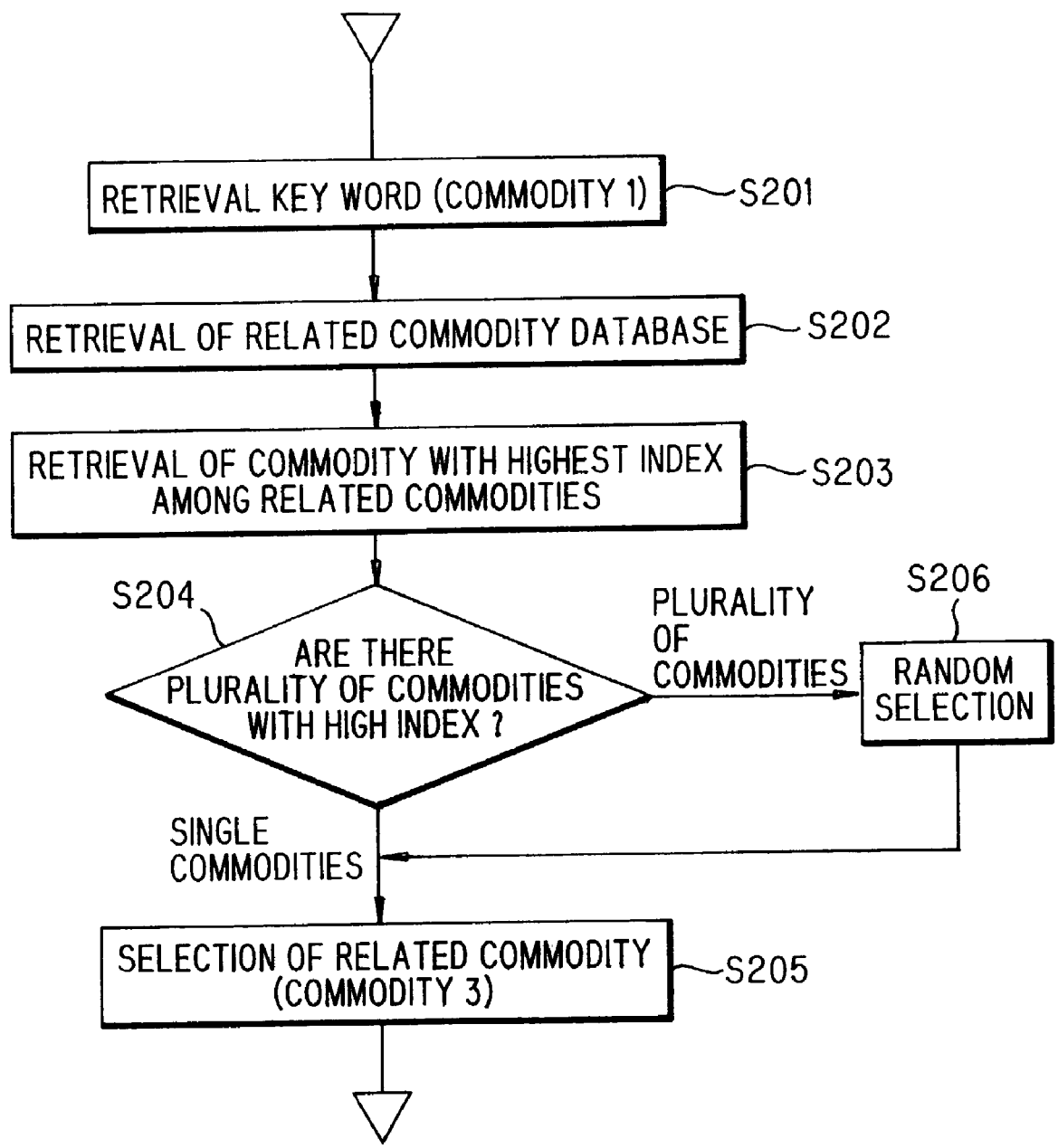
FIG. 4 is a flow chart showing detailed processing of step S105 in FIG. 2.

FIG. 4 shows detailed processing of step S105 in FIG. 2.

At the outset, "commodity 1," which has been sold to the customer A, is used as a key word (S201), and the related commodity database is searched based on this (S202). A commodity having a highest level of relation to the "commodity 1" sold to the customer is retrieved from the related commodity database (S203). At that time, a judgment is made on whether or not there are a plurality of commodities having the highest level of relation (highest-index commodities) (S204). When only one commodity having the highest level of relation exists, this commodity is selected as a related commodity (here "commodity 3") (S205). On the other hand, when there are a plurality of commodities having the highest level of relation, one of them is randomly extracted (S206) and is provided as a related commodity (S205).

As described above, according to this preferred embodiment of the invention, the following effects are attained.

(i) Since related database is searched using, as a key word, a commodity sold to a customer, an advertisement for a commodity, which has a high possibility of the customer buying it next time, can be properly made.

(ii) Since advertisement of commodities can be properly made for each customer, advertising costs can be reduced.

(iii) Since the database indicating the relation of commodities to each other is automatically updated concurrently with accounting for issuing a receipt, the latest database can be used.

(iv) Data on commodities having a high level of relation is automatically prepared, and the updated related commodity database is available. Therefore, this database can be utilized in ordering work.

[Other Preferred Embodiments]

Figure 5:
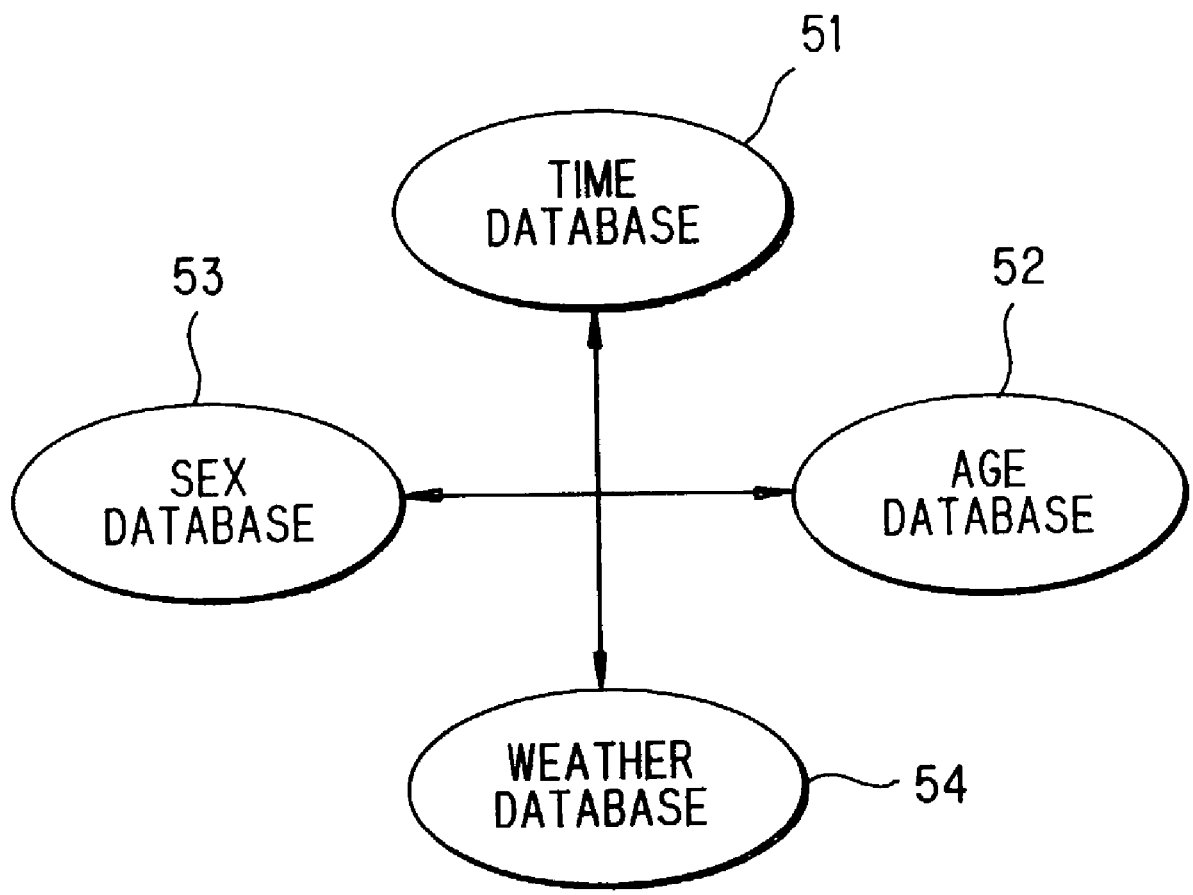
FIG. 5 is a diagram illustrating another preferred embodiment of the invention.

FIG. 5 shows another preferred embodiment of the invention.

The physical construction of this preferred embodiment is the same as that as shown in FIG. 1, except that the contents of the related commodity database are different. As shown in FIG. 5, a plurality of related commodity databases, such as a time database 51, an age database 52, a sex database 53, and a weather database 54, are prepared for each category using, as a condition, time, weather, sex, age, area or the like. Among these plurality of related commodity databases, a related commodity database depending upon the customer is used to retrieve a related commodity. Thus, in this preferred embodiment, a database selected by taking into consideration favorites of the customer or a change in environment such as weather is used, and, thus, advertisement for commodities, which are more suitable for the customer, can be made.

In the above preferred embodiments, information on a related commodity is printed on a receipt. Alternatively, information on the related commodity can be disposed (advertised) on a display device 3 so that the customer can see the screen of the display, or a display device only for customers. Further, in the above preferred embodiments, the related commodity database is prepared using the related commodity counter. Alternatively, the related commodity counter as such may be utilized as the related commodity database.

Information on a commodity related to the commodity sold to the customer, which is printed on a receipt, can also be utilized in other purposes. Specifically, in addition to printing, on the receipt, of the information (advertisement) on the commodity related to the commodity sold to the customer, the information can be utilized so that the receipt has a function as a discount coupon for the related commodity. In this case, discount coupons of commodities can be issued for respective customers, and a discount coupon for a commodity having a high possibility of the customer buying can be efficiently issued.

In the above preferred embodiments, the related commodity database and the related commodity counter are stored in the hard disk 18. Alternatively, a semiconductor memory may be used.

As is apparent from the foregoing description, in the POS apparatus according to the invention, when a customer has purchased a commodity, commodities having a high level of relation to the commodity sold to the customer are classified and a database is prepared by database construction means. Based on this database, a commodity having a high level of relation to the commodity sold to the customer is retrieved and extracted by processing means using, as a key word, the commodity sold to the customer and is printed on a receipt. According to this construction, when a customer buys a commodity, information (advertisement) on a commodity having a high level of relation to that commodity can be provided to the customer. By virtue of this, advertisement activity to customers, who come to the store, can be efficiently and effectively carried out. Further, when a database for a commodity having a high level of relation to the commodity sold to the customer is automatically updated, the latest related commodity database can be utilized. Further, since information on commodities useful for the customer can be provided, a relationship of mutual trust with the customer can be established. Further, since the advertisement can be efficiently made, a reduction in advertising costs and further sales promotion can be expected.

The invention has been described in detail with particular reference to preferred embodiments, but it will be understood that variations and modifications can be effected within the scope of the invention as set forth in the appended claims.

What is claimed is:

1. A POS (point of sales) apparatus adapted for settling the accounts for a commodity sold to a customer and for printing the results on a receipt to be handed to the customer at the place and time of sale, said POS apparatus comprising:

database constructing means for classifying a commodity with a high level of relation to a commodity sold to the customer and for preparing a database measuring a level of relation for commodities purchased by said customer at the same time; and processing means for retrieving from said prepared database at the place and time of said sale a related commodity with a high level of relation to a commodity sold to the customer by using, as a key word, the above commodity sold to the customer, the processing means automatically updating the database concurrently with the accounting each time a customer buys a commodity at the same time as another commodity; and means for printing information of the related commodity on the receipt.

2. The POS apparatus according to claim 1, wherein, when a plurality of related commodities having a high level of relation to the above commodity sold to the customer are retrieved from the database, the processing means randomly selects one of the plurality of related commodities to use it as the information of the related commodity.

3. The POS apparatus according to claim 1, wherein the information of the related commodity having a high level of relation to the above commodity sold to the customer contains the name and a recommendation message for the related commodity.

4. The POS apparatus according to claim 1, wherein the processing means prints, on the receipt, not only the information of the related commodity having a high level of relation to the above commodity sold to the customer but also a commodity discount coupon.

5. The POS apparatus according to claim 1, wherein the database constructing means produces a plurality of databases for the related commodity each prepared using as a condition upon said commodity counter measure, said measure being incremented at each said simultaneous purchase, a category comprising one or more of time and weather at the time of the simultaneous purchase of the related commodity, sex, age and area for the customer.

6. The POS apparatus according to claim 1, wherein the processing means displays the information of the related commodity on a display together with the printing of the information of the related commodity on the receipt.

7. The POS apparatus according to claim 1, wherein the level of relation for related commodities is considered high when a use of the one commodity in combination with the another commodity is expected to provide a better effect, or the commodities are in many cases simultaneously purchased by the customer due to a nature of a sales area.

8. The POS apparatus according to claim 1, wherein the related commodity with the high level of relation that has not been purchased is printed on the receipt.

9. A POS (point of sales) apparatus adapted for settling the accounts for a commodity sold to a customer and for displaying on a display information for the customer at the place and time of sale, said POS apparatus comprising:

database constructing means for classifying a commodity with a high level of relation to a commodity sold to the customer and for preparing a database showing a level of relation for related commodities, said database constructing means having a related commodity counter for recording as related commodities those commodities simultaneously purchased by the customer, the counter being incremented to show each instance that one commodity is purchased at the same time as another commodity, a value of the counter being a measure of said level of relation between any two commodities;

processing means for retrieving at the place and time of said sale, from the database as so prepared, a related commodity with a high level of relation to a commodity sold to the customer by using, as a key word, the above commodity sold to the customer; and means for displaying information of the related commodity on the display.

10. The POS (point of sales) apparatus as in claim 9, wherein said related commodity counter is implemented as a matrix relating each commodity to each other commodity.

11. The POS (point of sales) apparatus as in claim 9, wherein said related commodity counter is utilized as said database.

12. A POS (point of sales) apparatus adapted for settling the accounts for a commodity sold to a customer and for printing the results on a receipt to be handed to the customer at the place and time of sale, said POS apparatus comprising:

database constructing means for classifying a commodity with a high level of relation to a commodity sold to the customer and for preparing a database measuring a level of relation for commodities simultaneously purchased by the customer;

processing means for retrieving from said prepared database a related commodity with a high level of relation to a commodity sold to the customer by using, as a key word, the above commodity sold to the customer, the processing means automatically updating the database concurrently with accounting for all the commodities simultaneously purchased by a customer each instance that one commodity is purchased at the same time as another commodity; and means for printing information of the related commodity on the receipt.

* * * * *